United States Patent
Maria

(10) Patent No.: US 10,511,977 B2
(45) Date of Patent: *Dec. 17, 2019

(54) SPECTRUM ACCESS SHARING FRONT-END PROCESSOR FOR MOBILE MANAGEMENT ENTITIES

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,236

(22) Filed: Aug. 6, 2018

(65) Prior Publication Data

US 2018/0343568 A1   Nov. 29, 2018

Related U.S. Application Data

(63) Continuation of application No. 15/289,668, filed on Oct. 10, 2016, now Pat. No. 10,045,219.

(51) Int. Cl.
*H04W 16/14* (2009.01)

(52) U.S. Cl.
CPC .................. *H04W 16/14* (2013.01)

(58) Field of Classification Search
CPC ......... H04W 4/16; H04W 76/02; H04W 8/26; H04W 88/06; H04W 92/02; H04W 16/02; H04W 16/18; H04W 16/24; H04W 24/00; H04W 24/02; H04W 16/12; H04W 16/32; H04W 28/16; H04W 16/00; H04W 16/14; H04W 60/04; H04W 16/10; H04W 36/04; H04W 72/04

See application file for complete search history.

(56) References Cited

U.S. PATENT DOCUMENTS 8,989,021 B2  3/2015  Simon
9,094,899 B2  7/2015  Smith et al.
9,224,169 B2  12/2015  Smith et al.
(Continued)

FOREIGN PATENT DOCUMENTS

CN            103686887           3/2014

OTHER PUBLICATIONS

Christian, Ivan, "Spectrum mobility in cognitive radio networks," IEEE Communications Magazine, Jun. 2012, vol. 50, Issue 6, IEEE.
(Continued)

*Primary Examiner* — Sharad Rampuria
(74) *Attorney, Agent, or Firm* — Hartman & Citrin LLC

(57) ABSTRACT

Concepts and technologies are disclosed herein for providing a spectrum access sharing front-end processor for mobile management entities. A front-end processor of a mobile management entity associated with a carrier network can receive a spectrum allocation message. The spectrum allocation message can include data that indicates a spectrum allocation that should be implemented by the carrier network. The front-end processor can identify an eNodeB that is controlled by the mobile management entity, generate, based on the spectrum allocation message, a signaling command that includes data that indicates the spectrum allocation, and send the signaling command to the eNodeB.

20 Claims, 6 Drawing Sheets

(56) References Cited

U.S. PATENT DOCUMENTS

| | | |
|---|---|---|
| 9,374,827 B2 | 6/2016 | Rashid et al. |
| 9,843,624 B1 * | 12/2017 | Taaghol .................. H04L 67/10 |
| 2012/0120887 A1 | 5/2012 | Deaton et al. |
| 2012/0134328 A1 | 5/2012 | Gauvreau et al. |
| 2012/0163309 A1 | 6/2012 | Ma et al. |
| 2013/0095843 A1 | 4/2013 | Smith et al. |
| 2013/0201847 A1 | 8/2013 | Chincholi et al. |
| 2013/0294415 A1 * | 11/2013 | Moilanen .............. H04W 16/14 370/331 |
| 2013/0295948 A1 | 11/2013 | Ye et al. |
| 2013/0301609 A1 | 11/2013 | Smith et al. |
| 2014/0011509 A1 * | 1/2014 | Markwart ........... H04W 72/082 455/452.1 |
| 2014/0162667 A1 | 6/2014 | Mueck |
| 2014/0274103 A1 | 9/2014 | Steer et al. |
| 2014/0274104 A1 | 9/2014 | Amanna, III et al. |
| 2014/0295873 A1 | 10/2014 | Lunden et al. |
| 2015/0036509 A1 | 2/2015 | Lopes et al. |
| 2015/0043491 A1 | 2/2015 | Eng et al. |
| 2015/0133079 A1 | 5/2015 | Smith et al. |
| 2015/0156654 A1 * | 6/2015 | Trott ..................... H04W 16/14 370/252 |
| 2015/0245374 A1 | 8/2015 | Mitola, III et al. |
| 2016/0080172 A1 | 3/2016 | Uberoy |
| 2017/0188241 A1 | 6/2017 | Mueck |
| 2017/0295578 A1 | 10/2017 | Khoshnevisan |
| 2017/0332242 A1 | 11/2017 | Teng |
| 2018/0020356 A1 | 1/2018 | Gu |

OTHER PUBLICATIONS

Matinmikko, Marja, "Cognitive Radio Trial Environment: First Live Authorized Shared Access-Based Spectrum-Sharing Demonstration," IEEE Vehicular Technology Magazine, Jul. 25, 2013, vol. 8, Issue 3, IEEE.

Akyildiz, Ian F., "NeXt generation/dynamic spectrum access/ cognitive radio wireless networks: A survey," Computer Networks 50, May 17, 2006, pp. 2127-2159, Elsevier B.V.

U.S. Office Action dated Oct. 17, 2017 in U.S. Appl. No. 15/289,668.

U.S. Notice of Allowance dated Mar. 27, 2018 in U.S. Appl. No. 15/289,668.

* cited by examiner

SPECTRUM ACCESS SHARING FRONT-END PROCESSOR FOR MOBILE MANAGEMENT ENTITIES

CROSS-REFERENCE TO RELATED APPLICATIONS

This application is a continuation of and claims priority to U.S. patent application Ser. No. 15/289,668, entitled "Spectrum Access Sharing Front-End Processor For Mobile Management Entities," filed Oct. 10, 2016, now U.S. Pat. No. 10,045,219, which is incorporated herein by reference in its entirety.

BACKGROUND

In some modern mobility networks, much of the available spectrum may have been allocated to carriers. Thus, in some cases it may be difficult to obtain spectrum without incumbents agreeing to release all, or at least a portion, of the spectrum allocation associated with that carrier. Incumbents, however, may be government and/or military entities such as radar operators, military services, or the like. In some such cases, these military operators and/or other governmental entities may be unwilling to release their spectrum or even a portion thereof for a variety of reasons such as, for example, the resources may be vital to whatever purpose they serve, the cost of replacing and/or upgrading the resources with new equipment may exceed budgetary constraints, or the like.

To address these and other issues, the Federal Communications Commission ("FCC") recently ordered that the spectrum associated with 3.5 GHz will be shared between incumbents, new Priority Access Licensees ("PALs"), and General Access Licensees ("GALs"). Thus, future spectrum in certain bands, and not necessarily only the 3.5 GHz band, may be shared among military/government incumbents, commercial carriers, and new enterprises that may or may not be related to carriers. The sharing of spectrum may require a great deal of control and/or interaction to prevent interference between various types of communications, some of which may relate to military communications (that may be very sensitive to interference), some of which may be commercial in nature, and the like.

SUMMARY

The present disclosure is directed to providing a spectrum access sharing front-end processor for mobile management entities. The front-end processor can be configured to manage spectrum sharing and/or spectrum allocation for various reasons including, but not limited to, managing spectrum usage and/or frequency changes, managing handoffs effectively in shared spectrum environments, managing authentication in shared spectrum environments, and/or other applications.

An external controller device can generate a spectrum allocation message, which can include data, commands, instructions, and/or other information that can indicate how spectrum is to be allocated, how spectrum is to be shared, frequency changes to be implemented by a carrier network, and/or other spectrum-related information. The spectrum allocation message can be generated by the external controller device based on a number of trigger event such as, for example, receiving an allocation request from an entity; determining that a change is to be made based on various considerations; one or more time-based triggers such as periodic updates, expiration of a lease, or the like; instructions from other entities; combinations thereof; or the like. The external controller device can access the spectrum data and determine, based on the spectrum data, how spectrum is to be allocated and/or one or more frequency changes to be implemented.

A mobile management entity and/or a front-end processor associated therewith (and/or operating as a component thereof) can receive the spectrum allocation message or other data that can indicate how spectrum is to be shared and/or used by various components of a network such as the carrier network. The front-end processor of the mobile management entity can be configured to identify one or more eNodeBs that are controlled by the mobile management entity. The eNodeBs can be identified by the mobile management entity based on known communication and/or control channels between the mobile management entity and the eNodeBs, or in other manners.

The front-end processor of the mobile management entity can generate, based on the spectrum allocation message and/or data included therewith or therein, one or more signaling commands. The signaling commands can include data, commands, instructions, and/or other forms of information that, when received by the eNodeBs, can instruct the eNodeBs to communicate in accordance with a spectrum sharing and/or spectrum allocation scheme. The front-end processor of the mobile management entity can send the signaling instructions to the eNodeBs. The eNodeBs can receive the signaling instructions and implement the instructions so the eNodeBs operate in accordance with the signaling commands. The eNodeBs can be configured to authenticate devices, perform handoffs between networks, enhance reachability, support communications, and/or perform other operations in a shared spectrum environment.

According to one aspect of the concepts and technologies disclosed herein, a method is disclosed. The method can include receiving, at a front-end processor of a mobile management entity associated with a carrier network, a spectrum allocation message. The spectrum allocation message can include data that can indicate a spectrum allocation that should be implemented by the carrier network. The method also can include identifying, by the front-end processor, an eNodeB that is controlled by the mobile management entity; generating, by the front-end processor and based on the spectrum allocation message, a signaling command that can include data that indicates the spectrum allocation; and sending, by the mobile management entity, the signaling command to the eNodeB.

In some embodiments, the eNodeB is configured to implement the signaling command and to communicate in accordance with the spectrum allocation. In some embodiments, the method further can include generating, by the front-end processor, an allocation request and sending, by the front-end processor, the allocation request to an external controller device. In some embodiments, the spectrum allocation message can be received from the external controller device. In some embodiments, the spectrum allocation can include a frequency change that is to be implemented by the carrier network.

In some embodiments, the mobile management entity can include a virtual network function that can be instantiated by an orchestrator in communication with the carrier network. In some embodiments, the front-end processor can include another virtual network function. In some embodiments, the spectrum allocation message can be received from an external controller device. The external controller device can generate the spectrum allocation message based on carrier data that can define spectrum allocations for a plurality of carrier networks that can include the carrier network.

According to another aspect of the concepts and technologies disclosed herein, a system is disclosed. The system can include a processor and a memory. The memory can store computer-executable instructions that, when executed by the processor, cause the processor to perform operations. The operations can include receiving, at a front-end processor of a mobile management entity, a spectrum allocation message that can include data that can indicate a spectrum allocation that should be implemented by a carrier network, identifying an eNodeB that is controlled by the mobile management entity, generating, based on the spectrum allocation message, a signaling command including data that indicates the spectrum allocation, and sending the signaling command to the eNodeB.

In some embodiments, the eNodeB can implement the signaling command and can communicate in accordance with the spectrum allocation. In some embodiments, the computer-executable instructions, when executed by the processor, can cause the processor to perform operations further including generating an allocation request and sending the allocation request to an external controller device. In some embodiments, the spectrum allocation can include a frequency change that is to be implemented by the carrier network. In some embodiments, the system can also include an orchestrator. The mobile management entity can include a virtual network function that is instantiated by the orchestrator, and the front-end processor can include another virtual network function that is instantiated by the orchestrator.

According to yet another aspect, a computer storage medium is disclosed. The computer storage medium can store computer-executable instructions that, when executed by a processor, cause the processor to perform operations. The operations can include receiving, at a front-end processor of a mobile management entity, a spectrum allocation message that can include data that indicates a spectrum allocation that should be implemented by a carrier network; identifying an eNodeB that is controlled by the mobile management entity; generating, based on the spectrum allocation message, a signaling command including data that indicates the spectrum allocation; and sending the signaling command to the eNodeB.

In some embodiments the eNodeB can be configured to implement the signaling command and to communicate in accordance with the spectrum allocation. In some embodiments the computer-executable instructions, when executed by the processor, can cause the processor to perform operations that further can include generating an allocation request and sending the allocation request to an external controller device. In some embodiments the spectrum allocation message can be received from the external controller device. In some embodiments the spectrum allocation can include a frequency change that is to be implemented by the carrier network. In some embodiments the mobile management entity can include a virtual network function. In some embodiments the front-end processor can include a virtual network function.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
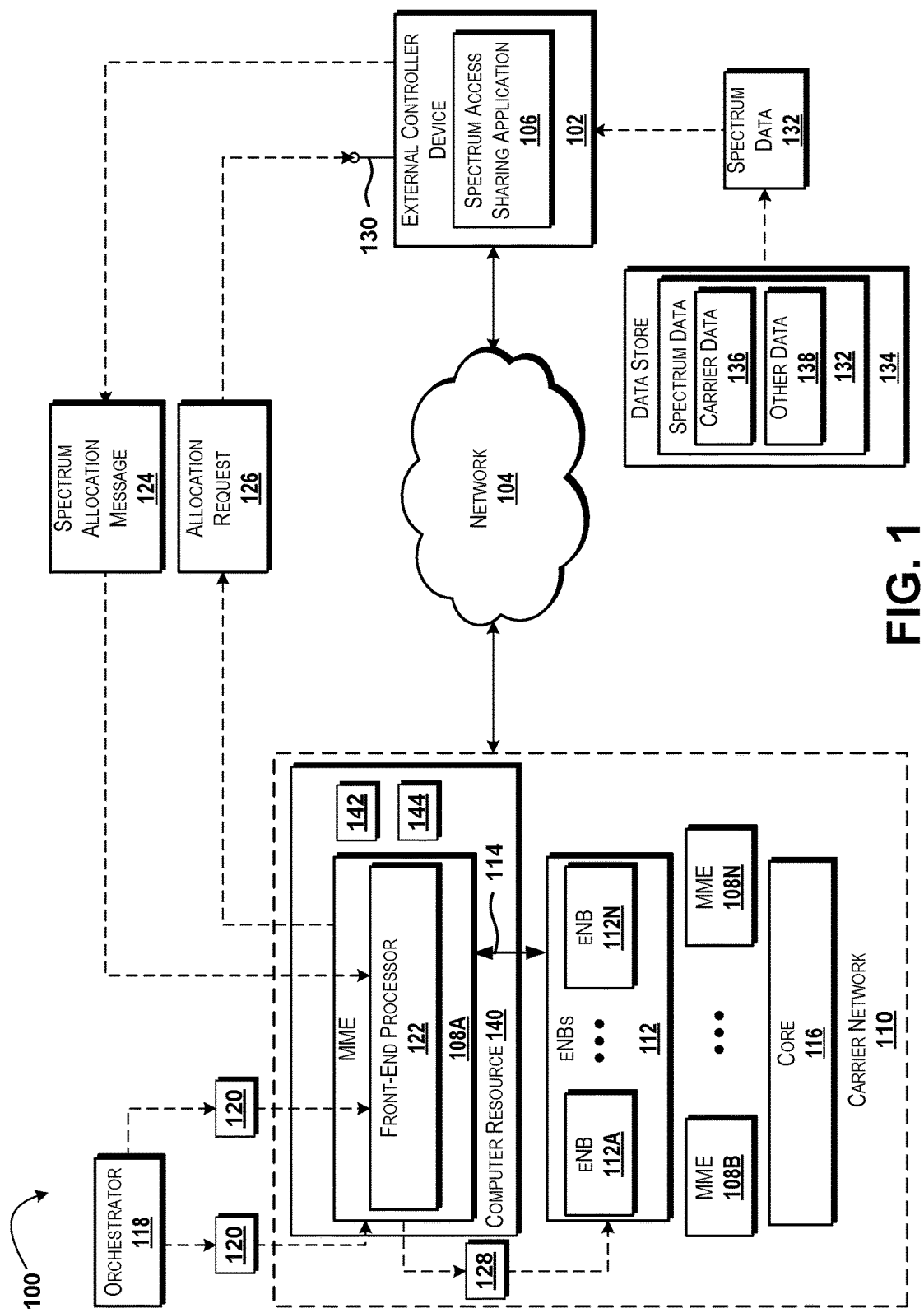
FIG. 1 is a system diagram illustrating an illustrative operating environment for various embodiments of the concepts and technologies described herein.

The following detailed description is directed to providing a spectrum access sharing front-end processor for mobile management entities. An external controller device can generate a spectrum allocation message, which can include data, commands, instructions, and/or other information that indicates how spectrum is to be allocated, how spectrum is to be shared, frequency changes to be implemented by a carrier network, and/or other spectrum-related information. The spectrum allocation message can be generated by the external controller device based on a number of trigger event such as, for example, receiving an allocation request from an entity; determining that a change is to be made based on various considerations; time-based triggers; instructions from other entities; combinations thereof; or the like. The external controller device can access the spectrum data and determine, based on the spectrum data, how spectrum is to be allocated and/or one or more frequency changes to be implemented.

A mobile management entity and/or a front-end processor associated therewith (and/or operating as a component thereof) can receive the spectrum allocation message or other data that can indicate how spectrum is to be shared and/or used by various components of a network such as the carrier network. The front-end processor of the mobile management entity can be configured to identify one or more eNodeBs that are controlled by the mobile management entity. The eNodeBs can be identified by the mobile management entity based on known communication and/or control channels between the mobile management entity and the eNodeBs, or in other manners.

The front-end processor of the mobile management entity can generate, based on the spectrum allocation message and/or data included therewith or therein, one or more signaling commands. The signaling commands can include data, commands, instructions, and/or other forms of information that, when received by the eNodeBs, can instruct the eNodeBs to communicate in accordance with a spectrum sharing and/or spectrum allocation scheme. The front-end processor of the mobile management entity can send the signaling instructions to the eNodeBs. The eNodeBs can receive the signaling instructions and implement the instructions so the eNodeBs operate in accordance with the signaling commands. The eNodeBs can be configured to authenticate devices, perform handoffs between networks, enhance reachability, support communications, and/or perform other operations in a shared spectrum environment.

As used herein, "front-end" can refer to a device, service, application, module, or other software, hardware, or combination thereof (including virtualized embodiments thereof) that can be accessed by other devices via an application programming interface, a portal, a hardware connection, a networking interface, a graphical user interface, combinations thereof, or the like. Thus, a "front-end processor" as used herein can refer to a hardware and/or software module (including virtualized embodiments thereof) that can be accessed directly and/or that can enable access to other elements associated with the front-end processor. In the context of the concepts and technologies disclosed herein, some embodiments of the front-end processor can enable access, by devices outside of a carrier network, to eNodeBs and/or other networking elements associated with the carrier network, wherein the front-end processor can enable the access as the front-end and/or as an intermediary. As explained herein, the front-end processor can include a component of a mobile management entity, and as such the access to the eNodeBs can be enabled via the mobile management entity by the front-end processor, in some embodiments.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing a spectrum access sharing front-end processor for mobile management entities will be described, according to an illustrative embodiment. The operating environment 100 shown in FIG. 1 includes an external controller device 102. The external controller device 102 can operate in communication with and/or as part of a communications network ("network") 104, though this is not necessarily the case. According to various embodiments of the concepts and technologies disclosed herein, the external controller device 102 can be associated with one or more government entity (e.g., the federal communications commission "FCC"), one or more non-governmental entity, one or more commercial entities, and/or one or more other entities. According to various embodiments of the concepts and technologies disclosed herein, the external controller device 102 can correspond to a spectrum access sharing ("SAS") controller that can be configured to propagate spectrum allocation and/or spectrum sharing decisions and/or schemes to one or more networks and/or network devices. It should be understood that this example is illustrative, and therefore should not be construed as being limiting in any way.

According to various embodiments, the functionality of the external controller device 102 may be provided by one or more server computers, desktop computers, mobile telephones, laptop computers, set-top boxes, other computing systems, and the like. It should be understood that the functionality of the external controller device 102 can be provided by a single device, by two or more similar devices, and/or by two or more dissimilar devices. For purposes of describing the concepts and technologies disclosed herein, the external controller device 102 is described herein as a server computer that includes a processor and a memory. It should be understood that this embodiment is illustrative, and should not be construed as being limiting in any way.

The external controller device 102 can execute an operating system (not shown in FIG. 1) and one or more application programs such as, for example, a spectrum access sharing application 106. The operating system can include a computer program that can be configured to control operations of the external controller device 102. The spectrum access sharing application 106 can include an executable program that can be configured to execute on top of the operating system to provide various functions illustrated and described herein for providing a spectrum access sharing front-end processor for mobile management entities. In some embodiments, the external controller device 102 also can execute other applications (not illustrated in FIG. 1) that may execute independently of the spectrum access sharing application 106 and/or that may be provided as part of the spectrum access sharing application 106.

The spectrum access sharing application 106 can be configured to interact with, communicate with, and/or manage spectrum allocation associated with, one or more mobile management entity ("MME") 108A-N (hereinafter collectively and/or generically referred to as "mobile management entities 108") associated with a carrier network 110. For example, as is shown in FIG. 1, the MME 108A can communicate with and/or control one or more eNodeBs (labeled "eNB" in FIG. 1) 112A-N (hereinafter referred to collectively and/or generically as "eNodeBs 112"). As is generally understood, the eNodeBs 112 can provide radio access to various devices. Thus, although not shown in FIG. 1, it can be appreciated that one or more user equipment ("UE") can communicate with the carrier network 110 via the eNodeBs 112, and that the eNodeBs 112 therefore can control communications associated with one or more UE in communication with the carrier network 110. It should be understood that this example is illustrative, and therefore should not be construed as being limiting in any way.

To perform the various functions associated with the carrier network 110, as shown in FIG. 1, each of the mobile management entities 108 can communicate with various components of a carrier network 110 including, but not limited to the eNodeBs 112. As schematically illustrated in FIG. 1, the eNodeBs 112 can be controlled by the mobile management entities 108 via the control link 114 between the eNodeBs 112 and the MME 108A. The control link 114 can correspond to a control channel, a communication channel, and/or other communication path. It should be understood that this example is illustrative, and therefore should not be construed as being limiting in any way.

One or more of the mobile management entities 108 also can be associated with various elements that can be part of a mobility core network ("core") 116. The core 116 can include, but is not limited to, various entities that can enable the provisioning and management of mobility services and/ or other network services. Thus, it can be appreciated that the core 116 can include, but is not limited to, one or more broadcast/multicast control ("BMC") entities; one or more evolved serving mobile location center ("ESLMC") entities; one or more gateway mobile location center ("GMLC") entities; one or more mobile switching center ("MSC") entities; one or more dynamic resource allocation ("DRA") entities; one or more home subscriber server ("HSS") entities; and/or other entities. By communicating with various elements of the core 116, the eNodeBs 112 can provide signaling relating to handoffs, authentication, provisioning, and the like, in addition to supporting data and/or voice communications. Because the function of the core 116 and/or the various elements of the core 116 are generally understood, these elements will not be further described herein.

Although the mobile management entities 108 are labeled as "MMES" in FIG. 1, it should be understood that the functionality of one or more of the mobile management entities 108 can be provided by one or more instances or pools of virtual mobile management entities. Thus, it can be appreciated that one or more of the mobile management entities 108 can function as a virtual mobile management entity ("vMME"). Thus, some embodiments of the operating environment 100 can include an orchestrator 118 or other orchestration functionality (e.g., a hypervisor, a virtual machine manager ("VMM"), and/or other entities), one or more of which can issue various types of commands 120 to instantiate and/or control the mobile management entities 108 and/or components thereof, as well as to allocate hardware resources that will support the mobile management entities 108 and/or components thereof.

According to various embodiments of the concepts and technologies described herein, the mobile management entities 108 can serve as control nodes for one or more of the eNodeBs 112. The mobile management entities 108 also can provide and/or include other functionality and therefore can be provisioned at various times to enhance features of a network in which the mobile management entities 108 are provisioned. As is generally understood, network operators can design networks with mobile management entity 108 overlap, e.g., eNodeBs 112 can be served by one or more mobile management entities 108 in some embodiments, and/or one or more eNodeBs 112 can be controlled by a single mobile management entity 108, though this is not necessarily the case. Thus, it can be appreciated that a particular mobile management entity 108 may control one or more eNodeBs 112 and/or that a particular eNodeB 112 may be controlled by one or more mobile management entities 108.

One or more of the mobile management entities 108, and in some embodiments, each of the mobile management entities 108, can include a front-end processor 122. The front-end processor 122 can include a hardware and/or software module that can be configured to obtain one or more spectrum allocation messages 124 or other information that can indicate a shared spectrum allocation and/or a frequency change or adjustment that is to be applied by the carrier network 110. According to various embodiments of the concepts and technologies disclosed herein, the front-end processor 122 can include an application that is configured to provide the functionality illustrated and described herein. According to some other embodiments of the concepts and technologies disclosed herein, the front-end processor 122 can include module (software, hardware, and/or a combination thereof) that can be included as part of a mobile management entity 108. In various embodiments, the front-end processor 122 can be hosted by the mobile management entity 108. In some other embodiments, as will be illustrated and described in more detail herein, the mobile management entity 108 and the front-end processor 122 can be virtualized and therefore one or more of these elements may be hosted by a computer or other computing resource, as will be explained in more detail below.

According to various embodiments of the concepts and technologies disclosed herein, the spectrum allocation messages 124 can be generated to inform one or more carrier network, for example the carrier network 110, to implement frequency changes. These frequency changes may be ordered to avoid conflict with radar, for example; to free up spectrum for military or police use, for example; to accommodate a new licensee; and/or for other reasons. Because the frequency changes may be ordered for additional and/or alternative reasons, it should be understood that these examples are illustrative, and therefore should not be construed as being limiting in any way.

According to various embodiments, the front-end processor 122 can receive a spectrum allocation message 124 from the external controller device 102, the spectrum access sharing application 106 hosted and/or executed thereby, and/or other entities. The front-end processor 122 can be configured to analyze the spectrum allocation message 124 to determine a spectrum allocation or spectrum change that is to be applied to the carrier network 110, or more particularly, how the eNodeBs 112 are to communicate in accordance with the spectrum allocation or spectrum change represented by the spectrum allocation message 124. Based at least in part on the analysis of the spectrum allocation message 124 by the front-end processor 122, the front-end processor 122 can determine how to instruct the eNodeBs 112 controlled by the mobile management entity 108 with which the front-end processor 122 is associated.

According to various embodiments, the front-end processor 122 can create one or more signaling commands 128 that can represent instructions for tuning or controlling the eNodeBs 112 in accordance with the spectrum allocation message 124. The signaling commands 128 can be sent by the front-end processor 122 and/or the mobile management entity 108 with which the front-end processor 122 is associated to adjust and/or control communications associated with each of the eNodeBs 112 controlled by the mobile management entity 108. Thus, it can be appreciated that the spectrum access sharing application 106 can, by way of communications with the front-end processor 122 of a particular mobile management entity 108, initiate control of spectrum usage of one or more eNodeBs 112. It should be understood that this example is illustrative and therefore should not be construed as being limiting in any way.

Although FIG. 1 illustrates the spectrum allocation message 124 being issued by the spectrum access sharing application 106, it should be understood that in some embodiments of the concepts and technologies disclosed herein, the spectrum allocation message 124 may not be issued by the spectrum access sharing application 106 without a trigger event of some sort. According to various embodiments of the concepts and technologies disclosed herein, the trigger event can include, but is not limited to, a change in spectrum allocation (detected or set by the spectrum access sharing application 106 or other entities); an explicit command by an entity associated with the spectrum access sharing application 106 and/or other entities to issue one or more spectrum allocation messages 124 to one or more entities; an explicit request for allocation information from the front-end processor 122, the mobile management entity 108, and/or other entities; combinations thereof; or the like. In some embodiments, one or more of the mobile management entities 108 and/or a front-end processor 122 associated therewith, can create an allocation request 126 that can correspond to an explicit request for allocation information. It should be understood that this example is illustrative, and therefore should not be construed as being limiting in any way.

The allocation request 126 can be created by the front-end processor 122 and/or the mobile management entity 108 and can be sent to the external controller device 102 (and/or the spectrum access sharing application 106 hosted and/or executed thereby) in some embodiments. In some other embodiments, the front-end processor 122 and/or the mobile management entity 108 can access a portal, an application programming interface, or other functionality ("API") 130 associated with the external controller device 102 and/or the spectrum access sharing application 106, and create the allocation request 126 via the API 130. Because the allocation request 126 can be omitted in some embodiments and/or because the allocation request 126 can be created in additional and/or alternative manners, it should be understood that these examples are illustrative, and therefore should not be construed as being limiting in any way.

Whether the spectrum allocation message 124 is created by the spectrum access sharing application 106 with or without a specific request therefor, it should be understood that the spectrum access sharing application 106 can generate the spectrum allocation message 124 in various manners. In various embodiments, the spectrum access sharing application 106 can determine that a spectrum allocation or spectrum change for a carrier network is to be made. As noted above, this determination can be based on a trigger such as a request, a command, a time-based consideration, or other event. In response to the determination, the spectrum access sharing application 106 can access spectrum data 132. The spectrum data 132 can define various variables, preferences, regulations, and/or other considerations that can affect how spectrum is allocated among various carrier networks such as the carrier network 110 and/or portions of various carrier networks such as the carrier network 110.

According to various embodiments, the spectrum data 132 can include carrier data 136 and/or other data 138. The carrier data 136 can define one or more carriers that can be associated with one or more carrier networks such as the carrier network 110; spectrum allocations associated with the various carriers and/or carrier networks such as the carrier network 110; one or more regulations, preferences, or considerations that may affect how spectrum is to be allocated to one or more carriers and/or carrier networks such as the carrier network 110; explicit spectrum allocation information associated with various carriers and/or carrier networks such as the carrier network 110; data identifying frequency changes that are to be made at various times; and/or other information that may define how carriers and/or carrier networks such as the carrier network 110 are to be allocated spectrum and/or how frequencies are to be changed in association with a spectrum allocation scheme. It should be understood that these examples are illustrative, and therefore should not be construed as being limiting in any way.

The other data 138 can include various other data and/or information that may be used to determine spectrum allocations, spectrum changes, and/or various aspects thereof such as, timing information, lengths of leases and/or allocations, historical information, regulatory information, combinations thereof, or the like. The other data 138 therefore can be used in association with the carrier data 136 to define, for example, a specific spectrum allocation for a carrier and an associated timeframe for that allocation. It should be understood that this example is illustrative, and therefore should not be construed as being limiting in any way.

The spectrum access sharing application 106 can access the spectrum data 132 and determine the spectrum allocations and/or spectrum changes for each of one or more carriers and/or carrier networks such as the carrier network 110. As used in the claims, a "spectrum change" can include, but is not limited to, changes in frequencies, changes in spectrum allocations, and/or allocations of frequencies and/or spectrum. Based on the determined spectrum allocations and/or spectrum changes, the spectrum access sharing application 106 can be configured to generate the spectrum allocation message 124 illustrated and described herein. The spectrum access sharing application 106 can also be configured to transmit the spectrum allocation message 124 to a front-end processor 122 of a mobile management entity 108 associated with a particular carrier network such as the carrier network 110.

It should be understood that according to various embodiments, the spectrum access sharing application 106 can be configured to issue spectrum allocation messages 124 to each front-end processor 122 associated with each mobile management entity 108 associated with each carrier network such as the carrier network 110, and that each of the front-end processors 122 can, directly or via their associated mobile management entity 108, instruct the eNodeBs 112 to implement the allocation scheme represented by the spectrum allocation message 124. Thus, the spectrum access sharing application 106 can effect spectrum allocation among one or more eNodeBs 112 associated with one or more mobile management entities 108 and/or one or more carrier networks such as the carrier network 110. Also, as explained in more detail herein, the eNodeBs 112 can perform various functions in a shared spectrum environment based on the implementation of the allocation scheme as illustrated and described herein. It should be understood that this example is illustrative, and therefore should not be construed as being limiting in any way.

According to various embodiments of the concepts and technologies described herein, the spectrum data 132 can be stored at a data storage device such as the data store 134. The functionality of the data store 134 can be provided by one or more databases, one or more server computers, one or more desktop computers, one or more mobile telephones, one or more laptop computers, and/or one or more other computing systems, and the like. It should be understood that in various embodiments, the functionality of the data store 134 can be provided by distributed computing and/or storage devices such as, for example, a data center. In the illustrated embodiments, the functionality of the data store 134 is provided by a server computer that hosts the spectrum data 132. It should be understood that this example is illustrative and therefore should not be construed as being limiting in any way.

As noted above, the front-end processor 122 can be configured to generate the signaling commands 128 and to send the signaling commands 128 to the eNodeBs 112 directly and/or via the mobile management entities 108 with which the front-end processor 122 is associated. The eNodeBs 112 can be configured to receive the signaling commands 128 and, in response to receiving the signaling commands 128, operate in accordance with the spectrum allocation represented by the spectrum allocation message 124. It can be appreciated that in various cases, the eNodeBs 112 may operate in accordance with the spectrum allocation represented by the spectrum allocation message 124 by tuning transmissions to particular frequencies for communications, ceasing transmission using particular frequencies, using or not using particular frequencies at or for particular times or time frames, combinations thereof, or the like. Because the eNodeBs 112 may operate in accordance with the spectrum allocation in additional and/or alternative manners, it should be understood that these example are illustrative, and therefore should not be construed as being limiting in any way.

As explained above with reference to the mobile management entities 108, some embodiments of the concepts and technologies disclosed herein rely on virtualization for some aspects of the operating environment 100 illustrated and described herein with reference to FIG. 1, while other embodiments do not rely on virtualization. It therefore should be understood that in some embodiments of the operating environment 100, the functionality of the front-end processor 122 can be provided by a virtual network function that can be instantiated as part of a mobile management entity such as the mobile management entities 108. Thus, as shown in FIG. 1, the front-end processor 122 can be instantiated by the orchestrator 118 or other orchestration functionality as explained herein. In some embodiments, the front-end processor 122 can be instantiated by one or more commands 120, which can instruct other devices or software to instantiate and/or control the front-end processor 122. Thus, in some embodiments the front-end processor 122 can be instantiated as a component (a virtual network function) of a virtual mobile management entity 108. It should be understood that this example is illustrative, and therefore should not be construed as being limiting in any way.

In some other embodiments, the functionality of the front-end processor 122 can be provided by a software or hardware module associated with the mobile management entity 108. Thus, the functionality of the front-end processor 122 can be part of a mobile management entity 108 as either a virtual network function of a virtual mobile management entity such as the mobile management entity 108 and/or as a hardware and/or software component of the mobile management entity such as the mobile management entity 108. Thus, embodiments of the concepts and technologies disclosed herein can enable the mobile management entity 108 to control spectrum usage of eNodeBs 112 without the involvement of other entities, though this is not necessarily the case. It should be understood that this example is illustrative, and therefore should not be construed as being limiting in any way.

Some embodiments of the concepts and technologies disclosed herein therefore can simplify the carrier network 110 by eliminating an element, or enabling prevention of an addition of a new element, to handle spectrum allocation. Some other embodiments of the concepts and technologies disclosed herein can improve the efficiency of controlling the eNodeBs 112 in accordance with the spectrum allocation scheme. For example, because the mobile management entities 108 can have established control of eNodeBs 112 via established signaling channels, embodiments of the concepts and technologies disclosed herein can obviate the creation and/or use of new communication channels and/or elements to operate the eNodeBs 112 in accordance with the spectrum allocation scheme, or the like, which can result in more efficient use of network resources and/or more efficient management of network components than would be available if new communication channels were created. It should be understood that these examples are illustrative, and therefore should not be construed as being limiting in any way.

As noted above, various embodiments of the concepts and technologies disclosed herein include the functionality of one or more mobile management entity 108 and one or more front-end processor 122 being provided by virtualized resources. Thus, as shown in FIG. 1, it should be understood that the one or more of the mobile management entity 108 and/or the front-end processor 122 can be hosted by a computer resource 140. The computer resource 140 can include one or more device. Thus, it can be appreciated that the computer resource 140 can be a single device, a distributed computing resource (e.g., resources of a data center), or the like. Also, the computer resource 140 can include a processor 142 and a memory 144. The functionality of neither, either, and/or both of the processor 142 and the memory 144 can be provided by virtualized resources (e.g., virtual machines providing processing and/or storage functions). Thus, in some embodiments, the computer resource 140 can host a virtual machine, which in turn can host the mobile management entity 108 and/or the front-end processor 122 as one or more virtual network functions and/or virtual service functions. It should be understood that these examples are illustrative, and therefore should not be construed as being limiting in any way. An example architecture that can be used to provide the functionality of the computer resource 140 is illustrated and described below with reference to FIG. 6.

In practice, an external controller device 102 can generate a spectrum allocation message 124, which can include data, commands, instructions, and/or other information that can indicate how spectrum is to be allocated, how spectrum is to be shared, frequency changes to be implemented by a carrier network, and/or other spectrum-related information. The spectrum allocation message 124 can be generated by the external controller device 102 based on a number of trigger event such as, for example, receiving an allocation request 126 from an entity; determining that a change is to be made based on various considerations; determining that one or more time-based trigger events have occurred and/or are implicated; receiving instructions from other entities; combinations thereof; or the like. The external controller device 102 can access the spectrum data 132 and determine, based on the spectrum data 132, how spectrum is to be allocated and/or one or more frequency changes to be implemented.

A mobile management entity 108 and/or a front-end processor 122 associated therewith (and/or operating as a component thereof) can receive the spectrum allocation message 124 or other data that can indicate how spectrum is to be shared and/or used by various components of a network such as the carrier network 110. The front-end processor 122 of the mobile management entity 108 can be configured to identify one or more eNodeBs 112 that are controlled by the mobile management entity 108. The eNodeBs 112 can be identified by the mobile management entity 108 based on known communication and/or control channels between the mobile management entity 108 and the eNodeBs 112, or in other manners.

The front-end processor 122 of the mobile management entity 108 can generate, based on the spectrum allocation message 124 and/or data included therewith or therein, one or more signaling commands 128. The signaling commands 128 can include data, commands, instructions, and/or other forms of information that, when received by the eNodeBs 112, can instruct the eNodeBs 112 to communicate in accordance with a spectrum sharing and/or spectrum allocation scheme. The front-end processor 122 of the mobile management entity 108 can send the signaling commands 128 to the eNodeBs 112. The eNodeBs 112 can receive the signaling commands 128 and implement the instructions so the eNodeBs 112 operate in accordance with the signaling commands 128.

As will be explained in more detail below, the eNodeBs 112 can control communications in a spectrum sharing environment based on the knowledge of the shared spectrum that results from the signaling illustrated and described herein. Thus, the eNodeBs 112 can manage authentication in a shared spectrum environment, manage handoffs between various networks in shared spectrum environments, enable enhanced reachability of UEs, and/or handle other signaling and/or communications in shared spectrum environments. Because the eNodeBs 112 can provide additional and/or alternative functionality in a shared spectrum environment, it should be understood that these examples are illustrative, and therefore should not be construed as being limiting in any way.

FIG. 1 illustrates one external controller device 102, one network 104, one carrier network 110, one orchestrator 118, one data store 134, and one computer resource 140. It should be understood, however, that various implementations of the operating environment 100 can include zero, one, or more than one external controller device 102 (or other device that provides the functionality of the spectrum access sharing application 106); zero, one, or more than one network 104; zero, one, or more than one carrier network 110; zero, one, or more than one orchestrator 118 (or other device or module that provides the functionality thereof); zero, one, or more than one data store 134; and/or zero, one, or more than one computer resource 140. As such, the illustrated embodiment should be understood as being illustrative, and should not be construed as being limiting in any way.

Figure 2:
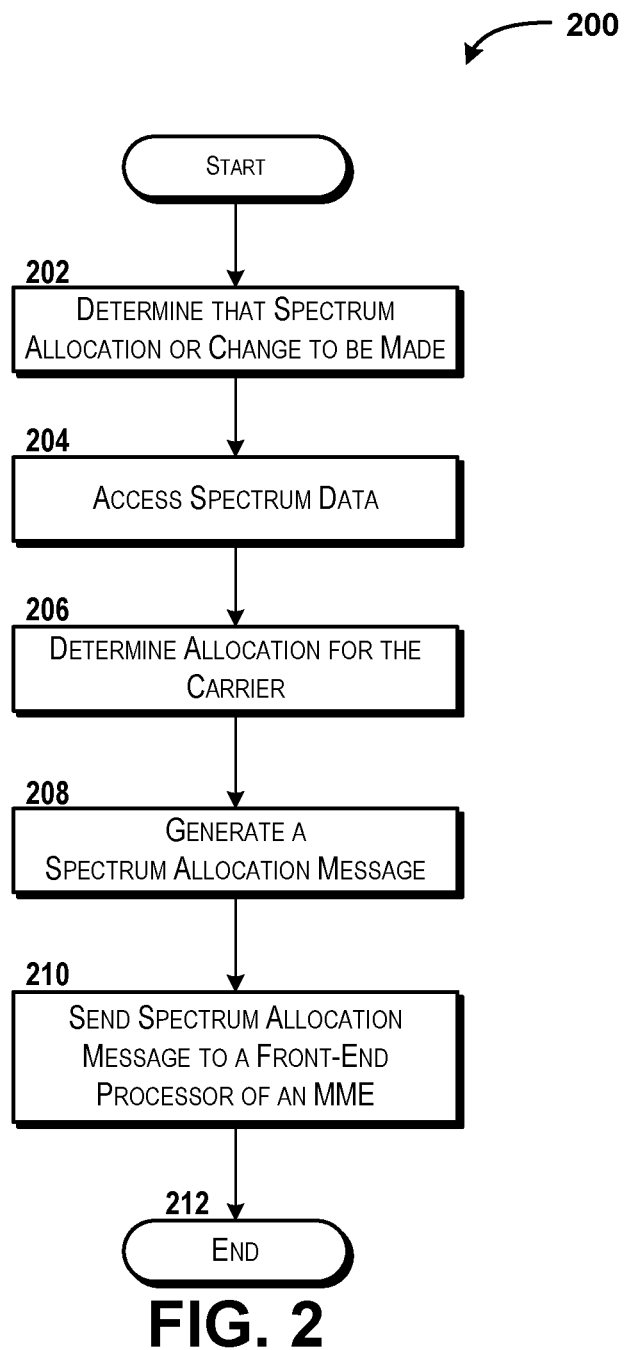
FIG. 2 is a flow diagram showing aspects of a method for providing a spectrum allocation message to a front-end processor, according to an illustrative embodiment of the concepts and technologies described herein.

Turning now to FIG. 2, aspects of a method 200 for providing a spectrum allocation message to a front-end processor will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the external controller device 102, the mobile management entity 108, the eNodeB 112, the front-end processor 122, and/or one or more computer resource 140 that host one or more of the mobile management entity 108 and/or the front-end processor 122, to perform one or more operations and/or causing the processor to direct other components of the computing system or device to perform one or more of the operations.

For purposes of illustrating and describing the concepts of the present disclosure, the method 200 is described as being performed by the external controller device 102 via execution of one or more software modules such as, for example, the spectrum access sharing application 106. It should be understood that additional and/or alternative devices and/or network nodes can provide the functionality described herein via execution of one or more modules, applications, and/or other software including, but not limited to, the spectrum access sharing application 106. Thus, the illustrated embodiments are illustrative, and should not be viewed as being limiting in any way.

The method 200 begins at operation 202. At operation 202, the external controller device 102 can determine that a spectrum allocation or spectrum change is to be made (or should be made). The external controller device 102 can determine, for example, that a new licensee is to be granted spectrum, and that as such, an incumbent (a carrier with spectrum and/or a portion of spectrum that is to be granted to the new licensee) should be instructed or requested to release spectrum. The external controller device 102 can also determine, for example, that a particular application (e.g., military application, police application, or other type of application) needs the spectrum or frequency currently used by an entity, and that change should therefore be made. In yet another example, the external controller device 102 may determine that due to interference or other considerations a particular user or carrier should release a particular frequency (or frequencies).

In some other embodiments, the external controller device 102 may be configured to periodically issue spectrum allocation messages 124 to carriers and/or carrier networks such as the carrier network 110 to indicate what spectrum, frequencies, and the like is to be used by the carrier and/or carrier network. Thus, the external controller device 102 can determine, in operation 202, that a spectrum allocation message 124 should be issued. In yet other embodiments, the external controller device 102 may determine that a particular entity has requested a spectrum allocation message 124 (e.g., the mobile management entity 108 can request a spectrum allocation message 124) by receiving a request such as the allocation request 126 and/or detecting creation of the request, e.g., via the API 130 as illustrated and described herein. As such, the external controller device 102 can determine, in operation 202, for any number of reasons, that a spectrum allocation message 124 should be sent to a mobile management entity 108 and/or a front-end processor 122 associated therewith.

From operation 202, the method 200 can proceed to operation 204. At operation 204, the external controller device 102 can access spectrum data such as the spectrum data 132 to determine allocations for the carriers and/or carrier networks such as the carrier network 110. In operation 204, the external controller device 102 can access the spectrum data 132 and analyze the spectrum data 132 to determine what spectrum is allocated to one or more carrier and/or carrier network such as the carrier network 110; if any frequency changes should be made for any reason; if any times associated with spectrum use result in any changes to spectrum allocation; or the like. Thus, in operation 204, the external controller device 102 can analyze the spectrum data 132, although this is not separately shown in FIG. 2.

From operation 204, the method 200 can proceed to operation 206. At operation 206, the external controller device 102 can determine an allocation for a carrier, for multiple carriers, and/or for one or more carrier networks such as, for example, the carrier network 110. Thus, in operation 206, the external controller device 102 can determine if any changes should be made to spectrum allocations and/or frequency allocations; if new spectrum and/or frequencies should be allocated to particular devices; if particular devices should release spectrum and/or frequencies; combinations thereof; or the like.

From operation 206, the method 200 can proceed to operation 208. At operation 208, the external controller device 102 can generate a spectrum allocation message such as, for example, the spectrum allocation message 124. According to various embodiments, the spectrum allocation message generated in operation 208 can include a command or other form of computer instructions that can be understood by a mobile management entity 108 and/or a front-end processor 122 as indicating spectrum allocations and/or spectrum changes to be made by the mobile management entity 108 and/or the front-end processor 122. Thus, in operation 208, the external controller device 102 can configure the spectrum allocation message (e.g., the spectrum allocation message 124) by creating the data, command, and/or instructions illustrated and described herein. It should be understood that this example is illustrative, and therefore should not be construed as being limiting in any way.

From operation 208, the method 200 can proceed to operation 210. At operation 210, the external controller device 102 can transmit the spectrum allocation message generated in operation 208, for example the spectrum allocation message 124 illustrated and described herein, to the front-end processor 122 of a mobile management entity 108 and/or to another recipient. According to various embodiments of the concepts and technologies disclosed herein, the mobile management entity 108 and/or the front-end processor 122 can be hosted and/or executed by a computer resource 140. As such, operation 210 can include the external controller device 102 transmitting the spectrum allocation message generated in operation 208 to the computer resource 140. Because the front-end processor 122 can be hardware and/or a software module that is included as part of the mobile management entity 108 in some embodiments, it should be understood that the above examples are illustrative and should not be construed as being limiting in any way.

From operation 210, the method 200 can proceed to operation 212. The method 200 can end at operation 212.

Figure 3:
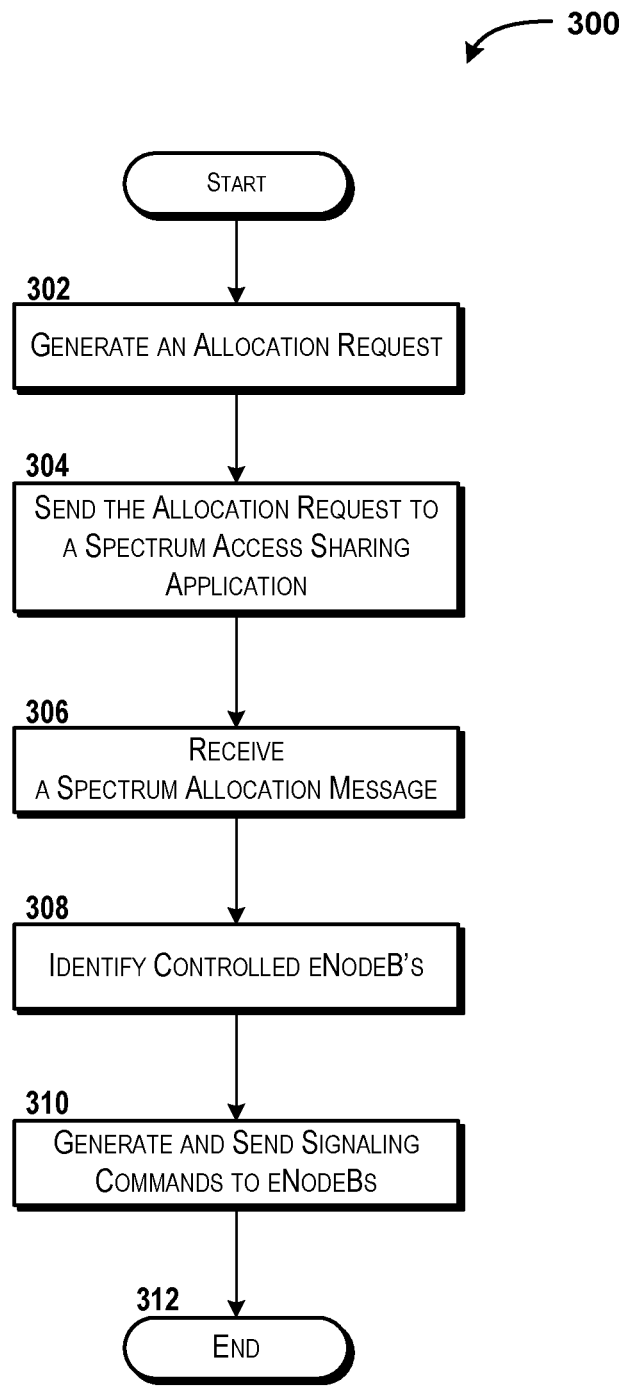
FIG. 3 is a flow diagram showing aspects of a method for receiving allocation information and propagating signaling commands to eNodeBs, according to an illustrative embodiment of the concepts and technologies described herein.

Turning now to FIG. 3, aspects of a method 300 for receiving allocation information and propagating signaling commands to eNodeBs will be described in detail, according to an illustrative embodiment. For purposes of illustrating and describing the concepts of the present disclosure, the method 300 is described as being performed by the mobile management entity 108 using the front-end processor 122. It should be understood that additional and/or alternative devices and/or network nodes can provide the functionality described herein, and/or that the functionality illustrated and described herein can be provided by the computer resource 140 via execution of one or more modules, applications, and/or other software including, but not limited to, virtual network functions that include the mobile management entity 108 and/or the front-end processor 122 illustrated and described herein. Thus, the illustrated embodiments are illustrative, and should not be viewed as being limiting in any way.

In FIG. 3, an example embodiment of the method 300 is shown wherein the mobile management entity 108 (and/or the front-end processor 122 associated therewith) generates an allocation request 126. As explained above, the allocation request 126 is optional in some embodiments and/or may be made at the external controller device 102 via a portal or API such as the API 130. As such, it should be understood that operations 302 and 304 of the method 300 as illustrated and described herein are illustrative of one embodiment and should not be construed as being limiting in any way.

The method 300 begins at operation 302. At operation 302, the mobile management entity 108 can generate an allocation request such as the allocation request 126. Although not separately shown in FIG. 3, it should be understood that the mobile management entity 108 can be configured to determine that an allocation request 126 should be made, for example, if a time limit associated with a use of a particular frequency and/or spectrum is about to expire, or the like. Regardless of why the mobile management entity 108 determines an allocation request 126 should be made, it should be understood that in operation 302, the mobile management entity 108 can create the allocation request 126. In some embodiments, the allocation request 126 can correspond to a request for data indicating a spectrum allocation and/or any spectrum changes that should be enacted by the mobile management entity 108 and/or the front-end processor 122. It should be understood that this example is illustrative, and therefore should not be construed as being limiting in any way.

From operation 302, the method 300 can proceed to operation 304. At operation 304, the mobile management entity 108 can send the allocation request generated in operation 302 to a spectrum access sharing application such as the spectrum access sharing application 106. As indicated above, it should be understood that the mobile management entity 108 and/or the front-end processor 122 may create a request for a spectrum allocation message 124 via a portal, API (e.g., the API 130), and/or other functionality, and as such, operations 302-304 may be omitted and/or replaced with a single operation for creating a request via a portal, API, or other functionality. It should be understood that this example is illustrative, and therefore should not be construed as being limiting in any way.

From operation 304, the method 300 can proceed to operation 306. At operation 306, the mobile management entity 108 can receive a spectrum allocation message such as the spectrum allocation message 124. It can be appreciated that in some embodiments, the spectrum allocation message 124 can be received by the mobile management entity 108 in operation 306 in response to generating and/or sending the allocation request 126 as illustrated and described herein. According to various embodiments, the spectrum allocation message 124 can be received in operation 306 by the front-end processor 122 of the mobile management entity 108 and/or by a computer resource that hosts the front-end processor 122 and the mobile management entity 108, for example, the computer resource 140 illustrated and described herein. It should be understood that this example is illustrative, and therefore should not be construed as being limiting in any way.

From operation 306, the method 300 can proceed to operation 308. At operation 308, the mobile management entity 108 can identify one or more eNodeBs 112 that are controlled by the mobile management entity 108. It can be appreciated that in various embodiments, the functionality illustrated and described herein with reference to operation 308 may be performed by the mobile management entity 108 by determining eNodeBs 112 with which the mobile management entity 108 has established control channels, by accessing a list of devices controlled by the mobile management entity 108, and/or via other operations. Thus, in operation 308, the mobile management entity 108 can identify one or more eNodeBs 112 that are controlled by the mobile management entity 108.

From operation 308, the method 300 can proceed to operation 310. At operation 310, the mobile management entity 108 can generate and send one or more signaling commands (e.g., the signaling commands 128 illustrated and described herein) to one or more of the eNodeBs 112 that the mobile management entity 108 determines are controlled by the mobile management entity 108. As explained above, the mobile management entity 108 can have established control channels and/or communication channels with the eNodeBs 112, and as such, the signaling commands sent in operation 310 can be transmitted via the existing control and/or communication channels. It should be understood that this example is illustrative, and therefore should not be construed as being limiting in any way.

From operation 310, the method 300 can proceed to operation 312. The method 300 can end at operation 312.

Figure 4:
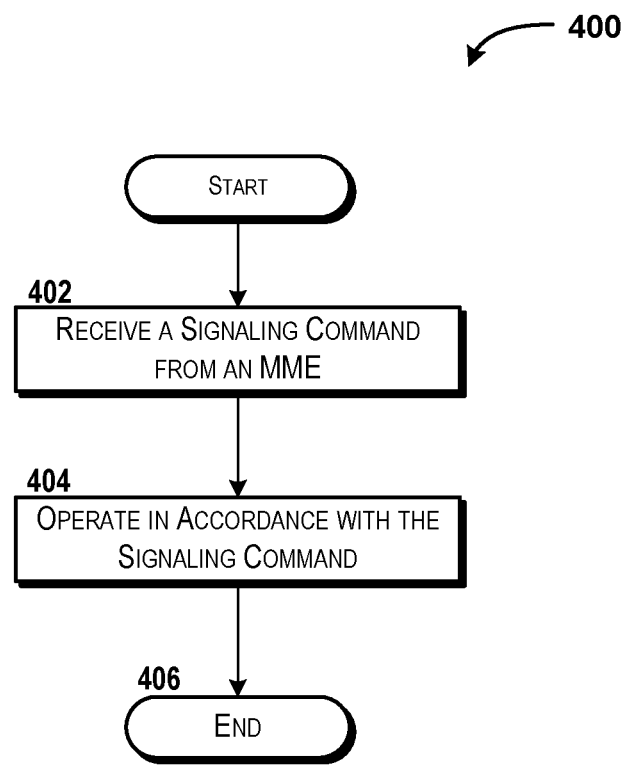
FIG. 4 is a flow diagram showing aspects of a method for implementing signaling commands at an eNodeB, according to an illustrative embodiment of the concepts and technologies described herein.

Turning now to FIG. 4, aspects of a method 400 for implementing signaling commands at an eNodeB will be described in detail, according to an illustrative embodiment. For purposes of illustrating and describing the concepts of the present disclosure, the method 400 is described as being performed by an eNodeB 112. It should be understood that additional and/or alternative devices and/or network nodes can provide the functionality described herein via execution of one or more modules, applications, and/or other software. Also, it should be understood that multiple eNodeBs 112 can provide the functionality illustrated and described herein. Thus, the illustrated embodiments are illustrative, and should not be viewed as being limiting in any way.

The method 400 begins at operation 402. At operation 402, the eNodeB 112 can receive a signaling command (e.g., the signaling command 128) from a mobile management entity such as the mobile management entity 108. The signaling command 128 can be configured to instruct the eNodeB 112 how to communicate, for example, by instructing the eNodeB 112 as to what frequencies to use, what frequencies not to use, times that frequencies are (or are not) to be used, and the like. It can be appreciated that the signaling commands 128 received in operation 402 can be based on the spectrum allocation message 124, and that as such, the receiving of the signaling commands (and the eventual operation in accordance therewith) can effect operation of a carrier network (e.g., the carrier network 110) and/or a portion thereof in accordance with a spectrum sharing scheme. It should be understood that this example is illustrative, and therefore should not be construed as being limiting in any way.

From operation 402, the method 400 can proceed to operation 404. At operation 404, the eNodeB 112 can operate in accordance with the signaling command 128 received in operation 402. Thus, in operation 404 the eNodeB 112 can cease communications on a particular frequency and/or release spectrum; begin communicating on a particular frequency and/or use spectrum; or the like. Because the eNodeBs 112 can communicate in accordance with the signaling commands in additional and/or alternative manners (some examples of which are described in further detail below), it should be understood that these examples are illustrative, and therefore should not be construed as being limiting in any way.

From operation 404, the method 400 can proceed to operation 406. The method 400 can end at operation 406.

The above description has illustrated and described various aspects of the concepts and technologies disclosed herein for providing a front-end processor 122 to manage spectrum access sharing by way of propagating spectrum access changes through a network via a front-end processor 122 of a mobile management entity 108 and its connections and communication channels with eNodeBs 112. The concepts and technologies disclosed herein also can be used to manage other aspects of spectrum sharing such as, for example, managing handoffs between private LTE-A environments using shared spectrum and managing security, authorization, and authentication of subscribers operating in shared spectrum environments, managing handoffs of UEs, enhancing UE reachability in shared spectrum environments, combinations thereof, or the like. Some aspects of these features of some embodiments of the concepts and technologies disclosed herein are addressed in more detail below, and some other features of some embodiments of the concepts and technologies disclosed herein are also discussed.

Some embodiments of the front-end processor 122 of the mobile management entity 108 can be configured to manage handoffs between networks including, but not limited to, private LTE-A environments and other environments. For example, a subscriber in a private LTE-A environment may leave the private LTE-A environment and the device may try to join a macro-RAN. Some embodiments of the concepts and technologies disclosed herein can provide a front-end processor 122 of the mobile management entity 108 that is able to identify the frequency that the UE is using in the private LTE-A environment, and relay the frequency to the appropriate eNodeB 112 in the carrier network 110. The mobile management entity 108 can also be configured to authenticate and authorize the UE prior to the handoff to the carrier network 110. It should be understood that this example is illustrative, and therefore should not be construed as being limiting in any way.

In some embodiments of the concepts and technologies disclosed herein, the front-end processor 122 of the mobile management entity 108 can interact with a home subscriber server ("HSS") and the radio access network ("RAN") to decide the appropriate radio resource management strategy for a shared spectrum environment. The front-end processor 122 of the mobile management entity 108 can also be configured to provide seamless inter-working for eNodeBs 112 operating in a shared spectrum environment. In particular, the front-end processor 122 of the mobile management entity 108 can be configured to operate in inter-eNodeB and inter-RAT environments, among others, which may be required in a shared spectrum environment. Because the front-end processor 122 of the mobile management entity 108 can be aware of frequency changes by SAS controllers such as the external controller device 102, the front-end processor 122 of the mobile management entity 108 can be configured to manage the assignments and changes associated with external SAS controller instructions such as, for example, the spectrum allocation message 124 illustrated and described herein. It should be understood that this example is illustrative, and therefore should not be construed as being limiting in any way.

In some embodiments of the concepts and technologies disclosed herein, the front-end processor 122 of the mobile management entity 108 also can be configured to provide management of roaming. In particular, because some embodiments of the front-end processor 122 of the mobile management entity 108 can have intimate knowledge of spectrum sharing across networks and/or operators, some embodiments of the front-end processor 122 of the mobile management entity 108 can be configured to support outbound and inbound roaming subscribers from other LTE/EPC systems and external/local LTE-A networks using shared spectrum. It should be understood that this example is illustrative, and therefore should not be construed as being limiting in any way.

In some embodiments of the concepts and technologies disclosed herein, the front-end processor 122 of the mobile management entity 108 also can be configured to enable and/or enhance UE reachability in a shared spectrum environment. In particular, because some embodiments of the front-end processor 122 of the mobile management entity 108 can have knowledge of shared spectrum allocations, some embodiments of the front-end processor 122 of the mobile management entity 108 can be configured to manage communications with the UE and the HSS to provide UE reachability and activity-related information.

In some embodiments of the concepts and technologies disclosed herein, the enhanced reachability provided by the front-end processor 122 of the mobile management entity 108 also can be used to enable lawful intercept functionality in a shared spectrum environment. In particular, because some embodiments of the front-end processor 122 of the mobile management entity 108 can have knowledge of shared spectrum, some embodiments of the front-end processor 122 of the mobile management entity 108 can be configured to manage the control plane of the carrier network 110. Thus, some embodiments of the front-end processor 122 of the mobile management entity 108 can be configured to location of a particular UE to a law enforcement monitoring facility when a UE is operating outside of a carrier's network. It should be understood that this example is illustrative, and therefore should not be construed as being limiting in any way.

Figure 5:
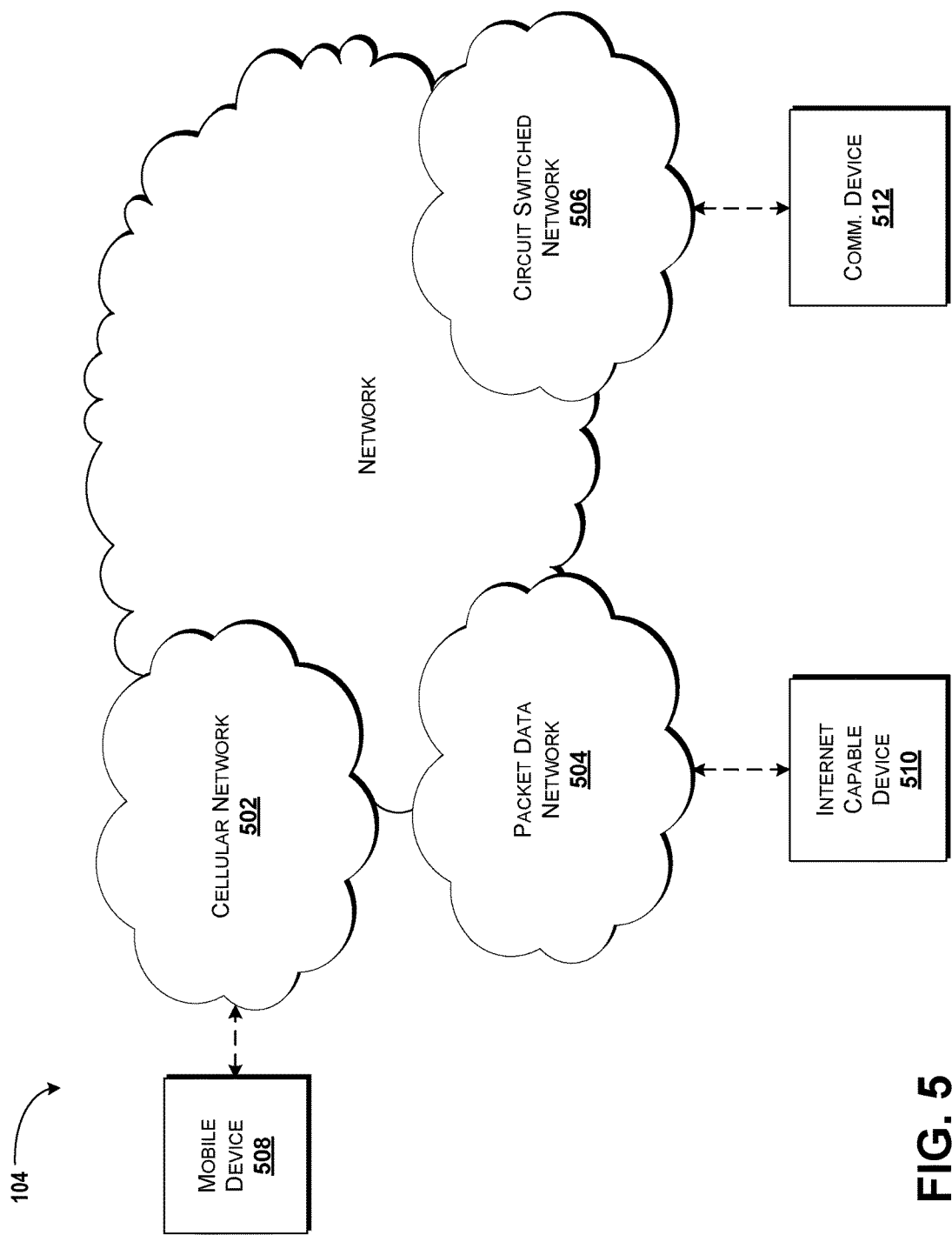
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
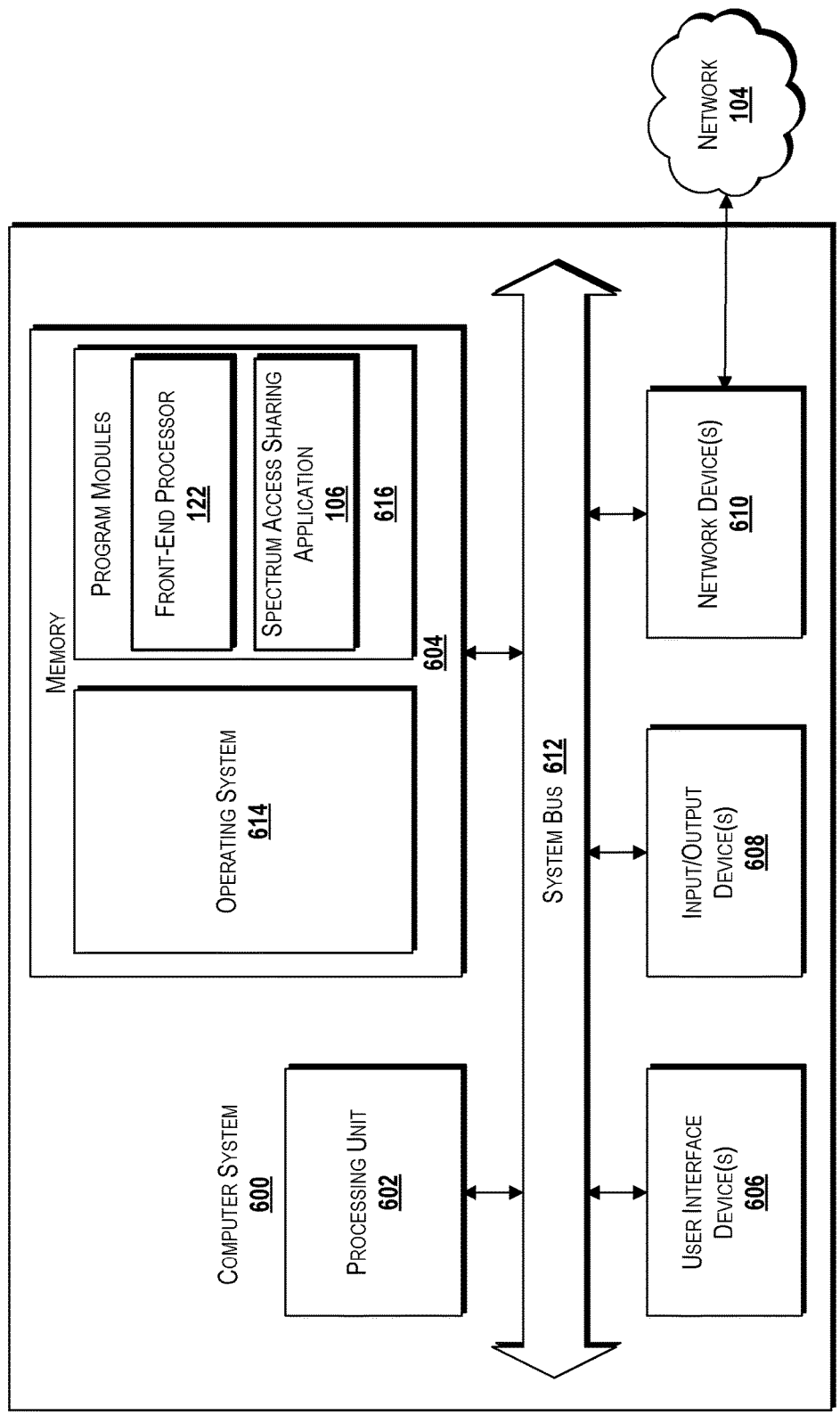
FIG. 6 is a block diagram illustrating an example computer system configured to provide a spectrum access sharing front-end processor for mobile management entities, according to some illustrative embodiments of the concepts and technologies described herein.

FIG. 6 is a block diagram illustrating a computer system 600 configured to provide the functionality described herein for providing a spectrum access sharing front-end processor for mobile management entities, in accordance with various embodiments of the concepts and technologies disclosed herein. It can be appreciated that the architecture illustrated and described herein with reference to FIG. 6 can apply to one or more of the external controller device 102, the mobile management entity 108, the front-end processor 122, the data store 134, and/or the computer resource 140. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the spectrum access sharing application 106, the orchestrator 118, the front-end processor 122, and/or other applications. In some embodiments, wherein the front-end processor 122 and the mobile management entity 108 are virtualized, the program modules 616 can include virtual network functions and/or virtual service functions that can be configured to provide the functionality of the mobile management entity 108 and/or the front-end processor 122. These and/or other programs can be embodied in computer-readable media containing instructions that, when executed by the processing unit 602, perform one or more of the methods 200, 300, 400 described in detail above with respect to FIGS. 2-4 and/or other functionality as illustrated and described herein.

It can be appreciated that, at least by virtue of the instructions embodying the methods 200, 300, and 400 and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the spectrum allocation message 124, the allocation request 126, the spectrum data 132 (and/or components thereof), and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media as defined herein.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a spectrum access sharing front-end processor for mobile management entities have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, at a front-end processor of a mobile management entity, a spectrum allocation message that indicates a spectrum allocation for implementation by a carrier network, wherein the mobile management entity is hosted by a computing resource that comprises a processor;
   identifying, by the front-end processor of the mobile management entity, an eNodeB that is controlled by the mobile management entity;
   generating, by the front-end processor of the mobile management entity and based on the spectrum allocation message, a signaling command comprising data that indicates the spectrum allocation; and
   sending, by the mobile management entity, the signaling command to the eNodeB to initiate implementation of the spectrum allocation indicated by the spectrum allocation message.

2. The method of claim 1, wherein the front-end processor interacts with a home subscriber server of the carrier network and a radio access network of the carrier network to determine a radio resource management strategy for the carrier network.

3. The method of claim 1, wherein the front-end processor manages communicates with a user equipment and a home subscriber server of the carrier network to provide user equipment reachability for the carrier network.

4. The method of claim 1, wherein the front-end processor provides roaming management for inbound roaming subscribers of the carrier network and for outbound roaming subscribers of the carrier network.

5. The method of claim 1, wherein the spectrum allocation comprises a frequency change that is to be implemented by the carrier network.

6. The method of claim 1, wherein the spectrum allocation message is received from an external controller device.

7. The method of claim 1, further comprising:
   generating, by the front-end processor, an allocation request; and
   sending, by the front-end processor, the allocation request to an external controller device.

8. A system comprising:
   a processor;
   a mobile management entity comprising a front-end processor; and
   a memory that stores computer-executable instructions that, when executed by the processor, cause the processor to perform operations comprising
      receiving, at the front-end processor, a spectrum allocation message that indicates a spectrum allocation for implementation by a carrier network, wherein the mobile management entity is hosted by a computing resource that comprises the processor,
      identifying, by the front-end processor, an eNodeB that is controlled by the mobile management entity,
      generating, by the front-end processor and based on the spectrum allocation message, a signaling command that indicates the spectrum allocation, and
      sending the signaling command to the eNodeB to initiate implementation of the spectrum allocation indicated by the spectrum allocation message.

9. The system of claim 8, wherein the front-end processor interacts with a home subscriber server of the carrier network and a radio access network of the carrier network to determine a radio resource management strategy for the carrier network.

10. The system of claim 8, wherein the front-end processor manages communicates with a user equipment and a home subscriber server of the carrier network to provide user equipment reachability for the carrier network.

11. The system of claim 8, wherein the front-end processor provides roaming management for inbound roaming subscribers of the carrier network and for outbound roaming subscribers of the carrier network.

12. The system of claim 8, wherein the spectrum allocation comprises a frequency change that is to be implemented by the carrier network.

13. The system of claim 8, wherein the spectrum allocation message is received from an external controller device.

14. The system of claim 8, further comprising:
   generating an allocation request; and
   sending the allocation request to an external controller device.

15. A computer storage medium having computer-executable instructions stored thereon that, when executed by a processor, cause the processor to perform operations comprising:
   receiving, at a front-end processor of a mobile management entity, a spectrum allocation message that indicates a spectrum allocation for implementation by a carrier network, wherein the mobile management entity is hosted by a computing resource that comprises the processor;

identifying, by the front-end processor, an eNodeB that is controlled by the mobile management entity;

generating, by the front-end processor and based on the spectrum allocation message, a signaling command that indicates the spectrum allocation; and sending the signaling command to the eNodeB to initiate implementation of the spectrum allocation indicated by the spectrum allocation message.

16. The computer storage medium of claim 15, wherein the front-end processor interacts with a home subscriber server of the carrier network and a radio access network of the carrier network to determine a radio resource management strategy for the carrier network.

17. The computer storage medium of claim 15, wherein the front-end processor manages communicates with a user equipment and a home subscriber server of the carrier network to provide user equipment reachability for the carrier network.

18. The computer storage medium of claim 15, wherein the front-end processor provides roaming management for inbound roaming subscribers of the carrier network and for outbound roaming subscribers of the carrier network.

19. The computer storage medium of claim 15, wherein the spectrum allocation comprises a frequency change that is to be implemented by the carrier network, and wherein the spectrum allocation message is received from an external controller device.

20. The computer storage medium of claim 15, wherein the computer-executable instructions, when executed by the processor, cause the processor to perform operations further comprising:

generating an allocation request; and sending the allocation request to an external controller device.

\* \* \* \* \*